United States Patent [19]
Guiselin et al.

[11] Patent Number: 5,965,246
[45] Date of Patent: Oct. 12, 1999

[54] TRANSPARENT SUBSTRATES COATED WITH A STACK OF THIN LAYERS HAVING REFLECTION PROPERTIES IN THE INFRARED AND/OR IN THE SOLAR RADIATION RANGE

[75] Inventors: Olivier Guiselin, Paris; Philippe Macquart, Asnieres; Veronique Rondeau, Drancy, all of France

[73] Assignee: Saint-Gobain Vitrage, Courbevoie, France

[21] Appl. No.: 08/660,176

[22] Filed: Jun. 3, 1996

[30] Foreign Application Priority Data

Jun. 1, 1995 [FR] France .................................. 95 06541

[51] Int. Cl.$^6$ ...................................................... B32B 17/06
[52] U.S. Cl. ........................ 428/212; 359/580; 359/585; 428/216; 428/332; 428/336; 428/432; 428/433; 428/446; 428/697; 428/699; 428/701; 428/702
[58] Field of Search ...................................... 428/432, 216, 428/336, 332, 212, 446, 697, 699, 701, 702, 433, 704; 359/580, 585

[56] References Cited

U.S. PATENT DOCUMENTS

| | | | |
|---|---|---|---|
| 4,413,877 | 11/1983 | Suzuki et al. | 350/1.7 |
| 4,790,922 | 12/1988 | Huffer | 428/432 |
| 4,919,778 | 4/1990 | Dietrich et al. | 204/192.27 |
| 5,254,392 | 10/1993 | Burns et al. | 428/432 |
| 5,595,825 | 1/1997 | Guiselin | 428/216 |
| 5,709,930 | 1/1998 | De Pauw | 428/216 |
| 5,776,603 | 7/1998 | Zagdown et al. | 359/586 |

*Primary Examiner*—Archene Turner
*Attorney, Agent, or Firm*—Oblon, Spivak, McClelland, Maier & Neustadt, P.C.

[57] ABSTRACT

The subject of the invention is a transparent substrate (1), in particular one made of glass, coated with a stack (7) of thin layers comprising at least one layer (4) having reflection properties in the infrared and/or in the solar radiation range, this layer (4) being interposed between a first and a second coating (3, 6) comprising a dielectric material. An interlayer (2) made of a material having a refractive index less than that of the substrate (1) is interposed between the substrate (1) and the stack (7) such that the difference in refractive indices between the substrate (1) and the layer (2) is at least 0.07 and preferably at least 0.12.

33 Claims, 1 Drawing Sheet

TRANSPARENT SUBSTRATES COATED WITH A STACK OF THIN LAYERS HAVING REFLECTION PROPERTIES IN THE INFRARED AND/OR IN THE SOLAR RADIATION RANGE

BACKGROUND OF THE INVENTION

1. Field of the Invention

The invention relates to transparent substrates, in particular those made of glass, coated with a stack of thin layers including at least one metal layer having reflective properties on long-wavelength infrared radiation and/or on solar radiation.

The invention also relates to the use of such substrates in the manufacture of thermal-insulation and/or solar-protection glazing, denoted hereinbelow by the term "functional" glazing. Such glazing may be used on both buildings and vehicles, especially for the purpose of decreasing the air-conditioning load and/or for reducing excessive overheating resulting from the presence of expansive glazed surfaces in rooms and passenger compartments.

2. Description of the Related Art

In the past, two approaches have been proposed for improving the thermal, antisolar or low emissivity properties of a stack of layers with reflective properties:

The first solution, which is the simplest, is to increase the thickness of the functional layer in order to lower the emissivity or increase the anti-solar capacity of the functional layer. However, this solution, has until the present invention had disadvantageous repercussions with respect to the optical appearance of the substrate carrying the stack, since it results in a decrease in its light transmission ($T_L$) and, above all, a more marked coloration in reflection, and usually, in tints which are unattractive. A limit in terms of thickness of the functional layer is therefore rapidly reached, beyond which the substrate no longer satisfies the desired optical criteria.

The second solution is to improve the quality of the "functional" layer, for a given thickness, through better crystallization which makes the layer less absorbent. This may be achieved by arranging below the functional layer, a particular type of dielectric material which promotes its growth or its "wetting". Thus, European Patent Application EP-A-0,611,213 recommends a wetting coating based on niobium or tantalum oxide below the low-emissivity silver layer, while French Patent Application 94/04810 filed on Apr. 21, 1994, published under the number FR-A-2,719,036 and corresponding to European Patent Application EP-A-0,678,484, describes a "double" wetting coating below the low-emissivity layer and consists of a first layer of niobium or tantalum oxide surmounted by a second layer of zinc oxide. This approach is limited because the quality of the functional layer improved by these subjacent layers reaches a maximum level which is difficult to exceed, for a given layer thickness.

SUMMARY OF THE INVENTION

The invention includes a stack of thin layers, which is known to provide transparent substrates with thermal properties, most particularly low emissivity, and mainly consists of a metal layer, in particular a silver layer, interposed between two coatings of dielectric material of metal oxide or nitride. The stack is generally manufactured by a succession of depositions carried out using a vacuum technique, such as cathodic sputtering, possibly assisted by a magnetic field. Two very thin metal layers may also be provided on either side of the silver layer, the subjacent layer as a bonding or nucleation layer and the superjacent layer as a protective or "sacrificial" layer so as to prevent the silver from oxidizing, if the dielectric layer which surmounts it is made of oxide deposited by reactive sputtering in the presence of oxygen.

Although the metal layer, denoted hereinbelow by the term "functional" layer, determines most of the thermal performance characteristics of the stack in its entirety, the layers of dielectric material also play an important role since they have a bearing on the optical appearance of the substrate in an interferential manner and protect the "functional" layer from chemical or mechanical attack. The objective of using this type of stack is to improve its thermal, anti-solar or low-emissivity properties.

Thus, the present invention alleviates the drawbacks of prior art methods by developing a novel type of stack for transparent substrates, having one or more functional layers which results in improved thermal performance characteristics without an unfavorable modification of its optical appearance. As a corollary, another object of the invention is to develop this stack so that it has thermal performance characteristics at least as high as those of existing stacks but has an improved optical appearance. More specifically, the intended object of the invention is to be able to simultaneously provide low emissivity (or anti-solar capacity), high luminous transmission and coloration neutrality in reflection.

DESCRIPTION OF THE PREFERRED EMBODIMENTS

Figure 1:
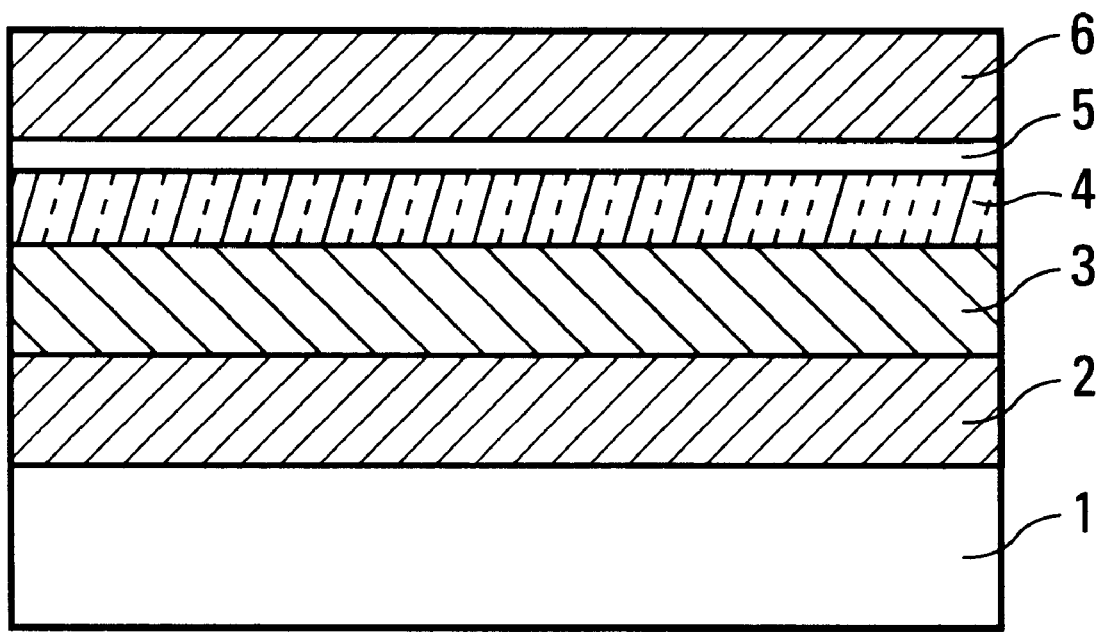
FIG. 1 illustrates the layers of the present invention. The glass substrate is surmounted by the interlayer 2 according to the invention and then the stack 7 of thin layers which includes a first dielectric coating 3, silver layer 4, a thin layer 5 protecting the silver layer and finally the second dielectric coating 6. This figure is, of course, highly diagrammatic and, for the purpose of clarity, the thicknesses of the various materials depicted are not shown to scale.

The subject of the invention is a transparent substrate, particularly one made of glass, coated with a stack of thin layers comprising at least one layer having reflection properties in the infrared and/or in the solar radiation range, in particular a metal layer, called hereinbelow a "functional" layer. This layer is interposed between a first and a second coating based on dielectric material. According to the intention, an additional layer called an "interlayer", which has the particular feature of consisting of a material having a refractive index less than that of the transparent substrate, is interposed between the transparent substrate and this stack, the difference between the refractive index of the substrate and that of this interlayer being at least 0.07 and preferably at least 0.12.

Surprisingly, it has in fact been observed that the optical appearance of the substrate may be influenced very advantageously, particularly in reflection, by interposing, between a known stack of the dielectric/functional layer/dielectric type and its carrier substrate, a layer having an index significantly lower than that of the substrate. It is thus possible, for a given thermal performance level, chosen based on the characteristics and on the thickness of the functional layer, to greatly improve the colorimetry in reflection of the substrate by "setting" the reflection of the substrate in a tint which is both attractive and very neutral.

The invention considerably increases the options for balancing thermal performance and optical performance. It is thus possible to choose a level of thermal properties already achieved by known similar stacks so as to improve coloration neutrality in reflection, an increasingly desirable criteria for glazing, intended most particularly for buildings. However, it is also possible to improve the thermal properties by thickening the functional layer, in particular by significantly extending the maximum thickness of the functional layer, above which thickness the substrate "switches" in reflection to a coloration of unacceptable tint, for example purple, and/or to too great a depth of color in reflection. The optical appearance in reflection is thus much less adversely affected.

The reasons for the technical effect of this low-index interlayer are complex. Although not intending to be bound by theory, it would seem in fact that the optical appearance of the substrate provided with the stack is associated, particularly in reflection, inter alia, with the difference in refractive indices between the dielectric material subjacent to the functional layer and the carrier substrate. The appearance in reflection is increasingly superior the greater this difference. The interlayer of the invention would therefore act as if to superficially lower the refractive index of the substrate, and therefore to increase this difference in refractive indices. This is a thoroughly advantageous solution as it is simple to carry out technically—it is not necessary to upset the structure or the nature of the materials used in the known stacks of dielectric/functional layer/dielectric.

However, the placing of a dielectric material having a high refractive index below the functional layer further enhances the beneficial effect of the interlayer of the invention with respect to the optical appearance of the substrate, by further increasing this difference in refractive indices.

Advantageously, the geometric thickness of the interlayer is at least 10 to 15 nm, preferably between 20 and 120 nm, and more particularly between 30 and 60 nm. The desired technical effect occurs optimally over this range of thicknesses.

In particular, when a transparent glass substrate is chosen, usually having a refractive index of approximately 1.50–1.54, preferably approximately 1.52 for a silico-soda-lime glass of the float-glass type, the interlayer according to the invention is chosen to have a refractive index less than or equal to 1.45, preferably less than or equal to 1.42 or to 1.40, and more preferably between 1.30 and 1.38.

However, the invention also advantageously applies to other types of transparent substrates, in particular those based on a rigid polyacrylic or polycarbonate polymer or a flexible polyester, polyimide, polyethylene, or polypropylene polymer and preferably, a polyethylene terephthalate polymer. In the latter case, it is possible to deposit the stack of thin layers on the PET-type flexible substrate and to then form a glazing by combining it with one or more glass substrates, in particular by using intermediate polyvinyl butyral (PVB) films. This type of flexible substrate is generally chosen to have a thickness of 5 to 50 microns.

The invention provides at least two embodiments for the interlayer.

Firstly, the layer may be inorganic, in particular a layer made of an oxide of low density, such as silicon oxide $SiO_2$ or $SiO_x$ where x<2, which may have an index of approximately 1.45 to 1.40, and preferably 1.42 to 1.40. Within the context of the invention, "low density" is understood to mean a silicon oxide which has a density preferably at most 95% of its nominal density, which is 2.2, and more preferably between 90 and 95% of the density. The layer may also be an aluminum oxyfluoride $AlO_xF_y$. A refractive index of about 1.37 may be achieved by suitably adjusting the amount of fluorine in the compound. It is also possible to use a fluoride, such as magnesium fluoride $MgF_2$ having an index of approximately 1.32, or aluminum fluoride $AlF_3$.

However, the interlayer may also be organic, preferably in the form of a polymer. Particularly low refractive indices thus may be achieved, preferably at most 1.35. The interlayer may thus be based on organosilicon polymers, for example those obtained by deposition of alkoxysilane or alkylsilane monomers using plasma-enhanced "Chemical Vapor Deposition" (CVD) deposition by pyrolysis in the gas phase, as described in Patent EP-B-0,230,188, which is incorporated herein by reference in its entirety.

It is also possible to use fluoropolymers and/or polymers based on monofunctional or polyfunctional polyacrylates, such as perfluoropolyether diacrylate having a refractive index of approximately 1.32. This type of polymer may be deposited on the substrate using a vacuum technique, preferably by evaporation of the volatile monomers or atomization of liquid monomers into microdroplets, followed by crosslinking by irradiation, preferably by ultraviolet or ion-beam radiation. More details on these deposition techniques can be found in, for example, PCT Application WO 94/04285 or Patent Application EP-A-0,340,935 which is incorporated herein by reference in their entireties. Such polymers have the advantage of being able to be used on line, continuously, on moving substrates, and of allowing consecutive uninterrupted deposition of the other layers of the stack using a vacuum technique, in particular magnetic-field-assisted cathodic sputtering.

When an organic interlayer is chosen, most particularly a polymeric one, its thickness may be selected within the aforementioned range of 20 to 120 nm. However, it is also possible to obtain the same technical effects by choosing thicknesses which are much greater. The layer may then be in the form of a film having a thickness of at least 2 micrometers, preferably a thickness of 5 to 50 micrometers. Use of an organic polymer makes it possible to achieve such thicknesses without adverse effects in terms of cost or rate of deposition, as might be the case for an inorganic oxide material. With such thicknesses, which are no longer interferential, the technical effect observed, particularly within the 20–120 nm range of interferential thicknesses, is surprisingly observed again.

The functional layer is advantageously a silver layer. Its thickness may be between 7 and 13 nm when glazing with low emissivity and high light transmission $T_L$ is intended (preferably a $T_L$ of at least 70 to 80%), in particular for equipping buildings or vehicles in cold countries.

Where the aim is to obtain glazing having an anti-solar, reflective function, particularly for equipping buildings or vehicles in hot countries, the silver layer may be thicker, preferably having thicknesses of up to 20 to 25 nm (which consequently decreases the light transmission, in particular down to values of less than 60%). The invention may also be advantageously applied to stacks which include a plurality of functional layers, for example two or three silver layers sandwiched by layers of dielectric material—stacks of this type are particularly described in European Patent Applications EP-A-0,628,528 and EP-A-0,645,352, which are incorporated herein by reference in their entireties.

The functional layer may also be based on a doped metal oxide, of fluorine-doped tin oxide $SnO_2$:F or Indium Tin Oxide (ITO), a material which also endows the substrate with low-emissivity and electrical conductivity properties. It may be deposited by a vacuum sputtering technique, or by a pyrolysis technique (for example using tin dibutyltrifluoride for $SnO_2$:F or using indium formiate for ITO by powder pyrolysis, in a known manner).

The first dielectric coating, i.e., the layer interposed between the interlayer and the functional layer, preferably comprises at least one oxide or nitride layer having a refractive index of at least 1.7 to 1.8, preferably approximately 1.9 to 2.3. As noted above, there is a real advantage in choosing a material having a relatively high refractive index. Its total geometric thickness is preferably between 10 and 55 nm. This first coating may thus include at least one layer of tin oxide ($SnO_2$), niobium oxide ($Nb_2O_5$), zinc oxide (ZnO), titanium oxide ($TiO_2$) tantalum oxide ($Ta_2O_5$), silicon nitride ($Si_3N_4$), tungsten oxide ($WO_3$), antimony oxide ($Sb_2O_5$) or bismuth oxide ($Bi_2O_3$). It may, for example, consist of a single layer of tin oxide. It may also be a niobium oxide/zinc oxide or tantalum oxide/zinc oxide sequence, as described in the aforementioned Patent Application EP-A-0,678,484, incorporated herein by reference in its entirety, a tin oxide/niobium oxide/zinc oxide, tungsten oxide/zinc oxide or tin oxide/zinc oxide, an antimony oxide/zinc oxide sequence, or a single layer of silicon nitride.

The second dielectric coating, i.e., the layer above the functional layer, preferably also includes at least one oxide or nitride layer having a refractive index of at least 1.7 to 1.8, such as tin oxide ($SnO_2$), niobium oxide ($Nb_2O_5$), titanium oxide ($TiO_2$), zinc oxide (ZnO), or tantalum oxide ($Ta_2O_5$) or may be made of a nitride, such as silicon nitride ($Si_3N_4$). Its total geometric thickness, like that of the first coating, is preferably between 30 and 55 nm.

In a known manner, a thin metal protective layer may be interposed between the functional layer and the second dielectric coating, which protective layer is partially oxidized, rather than the functional layer, when the second coating consists of one or more oxide layers deposited by reactive sputtering in the presence of oxygen. It is preferably based on a metal such as niobium (Nb), tantalum (Ta), titanium (Ti), chromium (Cr), nickel (Ni) or an alloy of at least two of these metals, such as an Ni—Cr alloy. If it is intended only to be a "sacrificial" layer, it may be extremely thin, preferably about 0.2 to 1.5 nm and more preferably 0.5 to 1.5 nm so as to have the least possible adverse effect on the stack in terms of light transmission. It may also have a thickness of up to 10 nm if it is also used to "adjust" the value of the light transmission to the desired level, when it is intended more for the manufacture of reduced-$T_L$ antisolar glazing.

The invention relates to any glazing, and particularly to any low-emissivity or antisolar multiple glazing, incorporating a substrate provided with the thin layers described previously. The invention relates most preferably to low-emissivity double glazing containing at least one such substrate and having an emissivity of at most 0.035, a $T_L$ of at least 78% and a color saturation value c* in the (L, a*, b*) colorimetry system of at most approximately 4 in reflection. The glazing according to the invention thus achieves very low values of emissivity without sacrificing the optical appearance, i.e., maintaining a high $T_L$ and a high color neutrality in reflection.

It is also possible to mount the substrates provided with the layers of the invention as laminated glazing, especially for vehicles, both as anti-solar glazing and heating glazing. In the latter case, ad hoc power leads are provided for the functional layer, which also has electrical conduction properties.

The invention also relates to the methods of obtaining the substrates provided with the stacks previously described: vacuum techniques such as evaporation or cathodic sputtering, may advantageously be used for depositing the layers, possibly with the assistance of a magnetic field.

When substrates capable of withstanding high temperatures, such as glass substrates, are used, it is also possible to deposit some of the layers of the stack, most particularly those based on an oxide or nitride, by pyrolysis techniques in the solid, liquid or gas phase (the latter technique being then called CVD for "Chemical Vapor Deposition"). It may be advantageous to combine the two types of techniques, and thus to deposit the interlayer, directly on the glass of a float-glass ribbon by pyrolysis when it is an oxide or oxyfluoride. Then, in a subsequent step, particularly when the functional layer is metal, more particularly silver, the other layers of the stack may be deposited on the glass by sputtering once the glass has been cut up. When an aluminum oxyfluoride interlayer is chosen, it may be deposited father by sputtering or by pyrolysis, preferably by pyrolysis in the vapor phase using an organometallic precursor, preferably one having alcoholate or β-diketone functionality of aluminum acetylacetonate or 2-methyl-4,6-hiptadione, on which compounds it is possible to substitute at least one of their hydrogen atoms by fluorine. It may thus be an aluminum trifluoroacetonate or a hexafluoroacetylacetonate. In order to guarantee a fluorine content high enough to obtain the desired refractive index, it is possible, for example, to add to this precursor a fluorine precursor $CF_4$ gas.

The details and advantageous characteristics of the invention will now emerge from the following nonlimiting examples, with the aid of FIG. 1.

It should be noted that, in all the examples, the thin layers are successively deposited by the magnetic-field-assisted cathodic sputtering technique, but they could equally well be deposited by any other technique allowing good control of the thicknesses of the layers obtained.

The substrates on which the stacks of thin layers are deposited are substrates of clear silico-soda-lime glass, of the Planilux type, 4 mm in thickness, which are sold by Saint-Gobain Vitrage. Their refractive index is approximately 1.52.

Examples 1 to 4 are produced in accordance with the invention. The following examples are comparative examples.

EXAMPLE 1

The sequence of the following layers is deposited on a glass substrate (1):

| glass / | $AlO_xF_y$ / | $SnO_2$/ZnO / | Ag / | Nb / | $SnO_2$ |
|---|---|---|---|---|---|
| (1) | (2) | (3) | (4) | (5) | (6) |

The $AlO_xF_y$ "interlayer" according to the invention has a thickness of 30 nm. It is deposited using an aluminum target in a reactive atmosphere made of a mixture of $O_2$, Ar and $CF_4$. Its refractive index is 1.37.

The $SnO_2$ layer has a thickness 15 nm. It is deposited using a tin target in a reactive atmosphere of $O_2$/Ar.

The ZnO layer has a thickness of 20 nm. It is deposited using a zinc target in a reactive atmosphere of $O_2/Ar$.

The silver layer has a thickness of 11 nm. It is deposited using a silver target in an argon atmosphere.

The protective layer has a thickness of 1 nm and is made of niobium, deposited using an Nb target in an argon atmosphere. It oxidizes, at least partially, during deposition of the following layer.

The following $SnO_2$ layer is deposited like the previous $SnO_2$ layer. It has a thickness of 44 nm.

EXAMPLE 2

The sequence of the following layers is deposited on a glass substrate (1):

| glass / | $AlO_xF_y$ / | $SnO_2/Nb_2O_5/ZnO$ / | Ag / | Nb / | $SnO_2$ |
|---|---|---|---|---|---|
| (1) | (2) | (3) | (4) | (5) | (6) |

The deposition conditions are the same as in Example 1. The only changes are the thicknesses involved and the fact that a $Nb_2O_5$ layer has been added to the first dielectric coating (3), deposited using an Nb target in an $Ar/O_2$ atmosphere:

the $AlO_xF_y$ layer: 45 nm the first $SnO_2$ layer: 20 nm the $Nb_2O_5$ layer: 8 nm the ZnO layer: 12 nm the Ag layer: 12 nm the Nb layer: 1 nm the second $SnO_2$ layer: 46 nm

EXAMPLE 3

The sequence of the following layers is deposited on a glass substrate (1):

| glass / | $AlO_xF_y$ / | $Nb_2O_5/ZnO$ / | Ag / | Nb / | $SnO_2$ |
|---|---|---|---|---|---|
| (1) | (2) | (3) | (4) | (5) | (6) |

In contrast to Example 2, this time the first layer of tin oxide has simply been omitted. The thicknesses of the layers are as follows:

the $AlO_xF_y$ layer: 40 nm the $Nb_2O_5$ layer: 8 nm the ZnO layer: 27 nm the Ag layer: 12 nm the Nb layer: 1 nm the $SnO_2$ layer: 46 nm

EXAMPLE 4

The sequence of Example 2 is repeated:

| glass / | $AlO_xF_y$ | $SnO_2/Nb_2O_5/ZnO$ / | Ag / | Nb / | $SnO_2$ |
|---|---|---|---|---|---|
| (1) | (2) | (3) | (4) | (5) | (6) | while modifying the thickness of some of the layers:

the $AlO_xF_y$ layer: 45 nm the first $SnO_2$ layer: 11 nm the $Nb_2O_5$ layer: 12 nm the ZnO layer: 10 nm the Ag layer: 13 nm the Nb layer: 1 nm the second $SnO_2$ layer: 45 nm

Comparative Example 5

The sequence of layers is the same as Example 2, but without the first $AlO_xF_y$ layer according to the invention:

| glass / | $SnO_2/Nb_2O_5/ZnO$ / | Ag / | Nb / | $SnO_2$ |
|---|---|---|---|---|
| (1) | (3) | (4) | (5) | (6) |

Comparative Example 6

The sequence of layers is the same as Example 3, but here too without the first $AlO_xF_y$ layer:

| glass / | $Nb_2O_5/ZnO$ / | Ag / | Nb / | $SnO_2$ |
|---|---|---|---|---|
| (1) | (3) | (4) | (5) | (6) |

Comparative Example 7

The sequence of layers is the same as Example 4, but without the first $AlO_xF_y$ layer:

| glass / | $SnO_2/Nb_2O_5/ZnO$ / | Ag / | Nb / | $SnO_2$ |
|---|---|---|---|---|
| (1) | (3) | (4) | (5) | (6) |

Each of these 7 substrates is then mounted as double glazing, with another substrate which is identical but devoid of any layers. The intercalary gas filling the space between the substrates is argon and has a thickness of 15 mm.

Table 1 below gives the following data for there 7 examples of double glazing: the value of the light transmission $T_L$ in %, the value of the solar factor SF (no unit, corresponding to the ratio of the total energy passing through the glazing to the incident solar energy, according to Standard ISO 9050), the value of the emissivity $\epsilon$, with no unit, and the value of the thermal transmission per unit area, called the K factor and expressed in $W/m^2.K$. The value of the external light reflection $R_{L\ ext}$ in % as well as the values of a*, b* and c*, no unit, of the colors in reflection according to the (L, a*, b*) colorimetry system are also given. The photometric measurements are made using the $D_{65}$ illuminant.

TABLE 1

| | $T_L$ | SF | $\epsilon$ | K | $R_{L\ ext}$ | a* | b* | c* |
|---|---|---|---|---|---|---|---|---|
| Example 1 | 78 | 58 | 0.044 | 1.14 | 12 | 1 | −3 | 3.2 |
| Example 2 | 79 | 59 | 0.035 | 1.10 | 12 | 0.8 | −3 | 3.1 |
| Example 3 | 78 | 59 | 0.035 | 1.10 | 12 | 1.2 | −2.5 | 2.8 |
| Example 4 | 77 | 56 | 0.030 | 1.08 | 14 | 1.1 | −4 | 4.1 |
| Comparative Ex. 5 | 79 | 59 | 0.035 | 1.10 | 12 | 3.2 | −7 | 7.7 |
| Comparative Ex. 6 | 78 | 59 | 0.035 | 1.10 | 12 | 3.6 | −6.5 | 7.4 |
| Comparative Ex. 7 | 77 | 56 | 0.030 | 1.08 | 14 | 3.5 | −8 | 8.7 |

The following conclusions may be drawn from this Table 1:

Comparative Examples 5 to 7 follow the teaching of the French Patent Application noted above in that they use, below the silver, a superposition of oxide layers which is particularly favorable to the crystallization and quality of the functional layer, and which allows very low emissivities to be achieved. Thus, using only a 12 nm silver layer, Example 5 achieves emissivity of 0.035 much lower than the emissivity which could be obtained for a silver layer of the same thickness interposed, for example, between two layers of tin oxides in a stack of the type:

| glass | / SnO$_2$ | / Ag | / NiCr | / SnO$_2$ |
|---|---|---|---|---|
| | 38 nm | 11 nm | 1.5 nm | 38 nm |

(by way of comparison, with this stack, an emissivity of about 0.077 is obtained for a T$_L$ of 78%).

However, this improvement is limited: in reflection, the value of the saturation c* given by the formula $(a^{*2}+b^{*2})^{1/2}$ is, for 12 nm of silver, close to 8, too intense a color if the intention is to manufacture glazing which is very neutral in reflection.

The examples according to the invention solve this dilemma by inserting a layer having a very low index between the glass and the stack. In other words, for equal thicknesses of the silver layer, the optical appearance in reflection is far superior. Thus, comparing comparative Example 5 and Example 2, it may be seen that the invention allows the value of c* to be reduced by at least a factor of 2. This same factor of 2 may be found between the saturations of Example 4 and comparative Example 7, or between the saturations of Example 3 and comparative Example 6.

Thus, the invention permits the use of 13 nm silver layers, at least in order to make glazing which has a high thermal performance but which remains acceptable from the calorimetric standpoint.

The invention is also advantageous where thinner silver layers are used, since the calorimetric appearance is further improved, rendering the color of the glazing in reflection even more "neutrally".

Likewise, the invention may be used in dielectric/silver/dielectric stacks which do not use layers having "wettability" of ZnO or Nb$_2$O$_5$ under the silver. The low-index interlayer according to the invention improves, in all cases, the colorimetry in reflection, whatever the intended "level of emissivity".

In order to confirm the latter point, mathematical models (results from computer modelling) have been constructed on the basis of the following three stacks:

| | | | | | |
|---|---|---|---|---|---|
| a) | glass | / SnO$_2$ | / Ag | / NiCr | / SnO$_2$ |
| | 3 mm | 40 nm | 10 nm | 5 nm | 42 nm |
| b) | glass | / AlO$_x$F$_y$ | / Ag | / NiCr | / SnO$_2$ |
| | 3 mm | 45 nm | 10 nm | 5 nm | 42 nm |
| c) | glass | / AlO$_x$F$_y$ | / Ag | / NiCr | / SnO$_2$ |
| | 3 mm | 60 nm | 12 nm | 5 nm | 42 nm |

These examples of glazing relatively thick NiCr layers compared to the stacks described previously, are therefore intended more for anti-solar applications with lower values of T$_L$ (at most 70 to 75%).

Calculations of the calorimetric appearance in reflection were carried out using these three substrates thus covered, assuming that they have been mounted as double glazing with a second substrate of the same thickness and characteristics (clear glass). The results in terms of a*, b* and c* values are gathered in Table 2 hereinbelow:

TABLE 2

| | a* | b* | c* |
|---|---|---|---|
| Stack a | −0.86 | −7.11 | 7.2 |
| Stack b | −4.4 | −1.53 | 4.37 |
| Stack c | −1.28 | −2.39 | 2.71 |

It may therefore be seen that the modelling confirms the experimental results obtained with the first series of examples, intended more for manufacture of high-T$_L$ glazing. With stack b containing the low-index layer, a saturation value c* is attained which is significantly lower than that of stack a which does not have this layer. As regards stack c, which is very efficient in terms of selectivity, since the 12 nm, thickness of the silver layer is relatively thick, its saturation value c* falls considerably due to the presence of the low-index sublayer whose thickness has been slightly increased.

Moreover, it may be noted that the very low-index layers may also find another application. By inserting them between a transparent substrate and an antireflection stack of thin layers, alternating layers having high and low refractive indices, a certain improvement in the performance of the antireflection coating is observed, in particular a decrease in its sensitivity to variations in thicknesses of the thin layers of which it is composed. The optical appearance of the thus-treated antireflection glazing is thereby more homogeneous.

What is claimed as new and desired to be secured by Letters Patent of the United States is:

1. A transparent substrate provided with a stack of thin layers, having an emissivity of at most 0.044, a light transmission of at least 78% and a color saturation value C* of at most approximately 4 in reflection, comprising at least one layer having reflection properties in the infra-red or solar radiation range or both, interposed between a first and second coating comprising a dielectric material, wherein an interlayer comprising material having a refractive index less than that of the substrate is interposed between the substrate and the stack such that the difference in a refractive indices between the substrate and the interlayer is at least 0.07.

2. The substrate according to claim 1, wherein said substrate is glass, a rigid polymer with polyacrylic or polycarbonate, or a flexible polymer of polyester, polyamide, polyethylene, polypropylene or polyethylene terephthalate.

3. The substrate of claim 1, wherein the interlayer is inorganic and a geometric thickness of the interlayer is between 20 and 120 nm.

4. The substrate of claim 1, wherein the interlayer has a refractive index less than or equal to 1.45, and a geometric thickness of the interlayer is between 20 and 120 nm.

5. The substrate of claim 4, wherein the interlayer is deposited by chemical vapor deposition (CVD).

6. The substrate of claim 1, wherein the interlayer is deposited by sputtering or by pyrolysis.

7. The substrate of claim 1, wherein the interlayer is inorganic.

8. The substrate of claim 7, wherein the interlayer comprises organo-silicon polymers.

9. The substrate of claim 8, wherein the interlayer comprises floropolymers, monofunctional or polyfunctional acrylate polymers or a mixture thereof.

10. The substrate of claim 9, wherein the polyfunctional acrylate polymers comprise perfluoropolyether diacrylate.

11. The substrate of claim 8, wherein the interlayer is vacuum-deposited by evaporation of volatile monomers, or by atomization of liquid monomers into microdroplets, and then cross-linking by irradiation using ultraviolet or ion-beam radiation.

12. The substrate of claim 8, wherein the interlayer has a refractive index of less than or equal to 1.35 and is composed of a layer of $SnO_2$ or $Si_3N_4$ or of $Nb_2O_5/ZnO$, or $Ta_2O_5/ZnO$ or $SnA_2/Nb_2O_5/ZnO$ or $WO_3/ZnO$ or $Sb_2O_5/ZnO$ or $SnO_2/ZnO$ sequence.

13. The substrate of claim 8, wherein the organo-silicon polymers are deposited by plasma-enhanced CVD.

14. The substrate of claim 7, wherein the organic interlayer is a film of at least 2 micrometers in thickness.

15. The substrate of claim 14, wherein the organic interlayer is a film of between 5 and 50 micrometers.

16. The substrate of claim 1, wherein the layer having reflection properties in the infrared or solar radiation range or both comprises silver and the substrate has low-emissivity properties.

17. The substrate of claim 16, wherein the layer has a thickness of 7 to 13 nm.

18. The substrate of claim 1, wherein the stack of layers includes layers having reflection properties in the infra-red or solar radiation range or both.

19. The substrate of claim 18, wherein the layers having reflection properties in the infrared or solar radiation range or both are interposed between layers of dielectric material.

20. The substrate according to claim 1, wherein the first dielectric coating includes at least one oxide or nitride layer having a refractive index of less than 1.7 to 1.8 with a total geometric thickness of between 30 and 50 nm.

21. The substrate of claim 20, wherein the first dielectric coating includes at least one layer of a material chosen from the group $SnO_2$, $Nb_2O_5$, ZnO, $TiO_2$, $Ta_2O_5$, $Si_3N_4$, $WO_3$, $Sb_2O_5$ and $Bi_2O_3$.

22. The substrate of claim 21, wherein the second dielectric coating includes at least one oxide or nitride layer having a refractive index of at least 1.7 to 1.8, with a total geometric thickness of between 30 and 55 nm.

23. The substrate of claim 1, wherein a thin protective layer made of partially oxidized metal selected from the group consisting of Nb, Ta, Ti, Cr, Ni or alloys of at least two of these metals, having a thickness of from 0.2 to 1.5 nm, is arranged on the layer having reflection properties in the infrared or solar radiation range or both and below the second coating of dielectric material.

24. A low-emissivity or anti-solar multiple glazing, comprising at least one substrate of claim 1.

25. The low-emissivity double glazing of claim 24, having an emissivity of at most 0.044, a light transmission $T_L$ of at least 78% and a color saturation value c* of at most approximately 4 in reflection.

26. A laminated glazing, comprising the substrate of claim 1, wherein power leads are provided to the metal layer(s) giving the glazing anti-solar or heating properties or both.

27. The substrate of claim 1, wherein the layer having reflection properties in the infrared or solar radiation range or both is metal or a doped metal oxide.

28. The substrate of claim 1, wherein the difference in refraction indices between the substrate and the interlayer is at least 0.12.

29. The substrate of claim 1, wherein the interlayer is inorganic and the geometric thickness of the interlayer is between 30 and 60 nm.

30. The substrate of claim 1, the interlayer is inorganic and the refractive index is less than or equal to 1.40.

31. The substrate of claim 30, wherein the interlayer is inorganic and the refractive index is between 1.30 and 1.38.

32. The substrate of claim 30, wherein the inorganic interlayer is an oxide or fluoride.

33. The substrate of claim 32, wherein the inorganic interlayer is silicon oxide of low density, aluminum oxifluoride, magnesium fluoride or aluminum fluoride.

* * * * *